(12) United States Patent
Lin

(10) Patent No.: US 9,928,608 B2
(45) Date of Patent: Mar. 27, 2018

(54) MONITOR DEVICE AND DYNAMIC OBJECT MONITORING METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Hung-Chang Lin, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 163 days.

(21) Appl. No.: 14/886,233

(22) Filed: Oct. 19, 2015

(65) Prior Publication Data

US 2016/0127696 A1    May 5, 2016

(30) Foreign Application Priority Data

Oct. 31, 2014    (TW) .................................. 103137718

(51) Int. Cl.
*H04N 7/18*       (2006.01)
*H04N 5/232*      (2006.01)
(Continued)

(52) U.S. Cl.
CPC ........ *G06T 7/2053* (2013.01); *G06K 9/00771* (2013.01); *H04N 5/23206* (2013.01);
(Continued)

(58) Field of Classification Search
CPC .. G06T 7/2053; H04N 5/23219; H04N 19/17; H04N 19/137; H04N 19/102;
(Continued)

(56) References Cited

U.S. PATENT DOCUMENTS

2009/0022362 A1*   1/2009   Gagvani ................. G06T 7/254
                                                                 382/100
2009/0154768 A1*   6/2009   Bell ...................... G06K 9/2054
                                                                 382/103

(Continued)

*Primary Examiner* — Christopher S Kelley
*Assistant Examiner* — Nasim Nirjhar
(74) *Attorney, Agent, or Firm* — ScienBiziP, P.C.

(57) ABSTRACT

A dynamic object monitoring method including, setting types of monitored zones of a monitored region in a video frame captured by a network camera and setting device parameters and sensitivity values corresponding to each of the monitored zones. Analyzing the predicted macro blocks of a current shooting frame retrieved by the network camera according to the prediction mode of the MPEG-4 encoding algorithm. Counting a number of the predicted macro blocks of each of the monitored zones. Determining whether a number of predicted macro blocks of a monitored zone is equal to or greater than a corresponding preset value. A monitored zone is determined where a dynamic object is located. The device parameters of the network camera as device parameters of the monitored zone are adjusted where the dynamic object is located for recording.

6 Claims, 3 Drawing Sheets

(51) Int. Cl.
    *H04N 19/176*     (2014.01)
    *G06T 7/20*     (2017.01)
    *G06K 9/00*     (2006.01)
    *H04N 19/52*     (2014.01)
    *H04N 5/77*     (2006.01)
    *H04N 19/159*     (2014.01)
    *H04N 19/102*     (2014.01)
    *H04N 19/137*     (2014.01)
    *H04N 19/17*     (2014.01)

(52) U.S. Cl.
    CPC ............ *H04N 5/23219* (2013.01); *H04N 5/77* (2013.01); *H04N 19/102* (2014.11); *H04N 19/137* (2014.11); *H04N 19/159* (2014.11); *H04N 19/17* (2014.11); *H04N 19/176* (2014.11); *H04N 19/52* (2014.11)

(58) Field of Classification Search
    CPC ........ H04N 19/159; H04N 5/77; H04N 19/52; H04N 5/23206; H04N 19/176; G06K 9/00771
    See application file for complete search history.

(56) References Cited

U.S. PATENT DOCUMENTS

2010/0074339 A1\*   3/2010   Yonemoto ............ H04N 19/176
                                                                       375/240.24
2010/0124274 A1\*   5/2010   Cheok .................. H04N 19/176
                                                                         375/240.03

\* cited by examiner

MONITOR DEVICE AND DYNAMIC OBJECT MONITORING METHOD

CROSS-REFERENCE TO RELATED APPLICATIONS

This application claims priority to Taiwanese Patent Application No. 103137718 filed on Oct. 31, 2014, the contents of which are incorporated by reference herein.

FIELD

The present disclosure generally relates to monitor technology

BACKGROUND

Dynamic object detections and applications are provided by a network camera. In general, a dynamic object is determined by the difference between two or more frames, which is inaccurate and noisy. In order to improve accuracy, additional operations are required that easily make the camera use excessive power and overheat leading to breakdowns and shortened equipment life.

BRIEF DESCRIPTION OF THE DRAWINGS

Implementations of the present technology will now be described by way of example only with reference to the attached figures.

DETAILED DESCRIPTION

Figure 1:
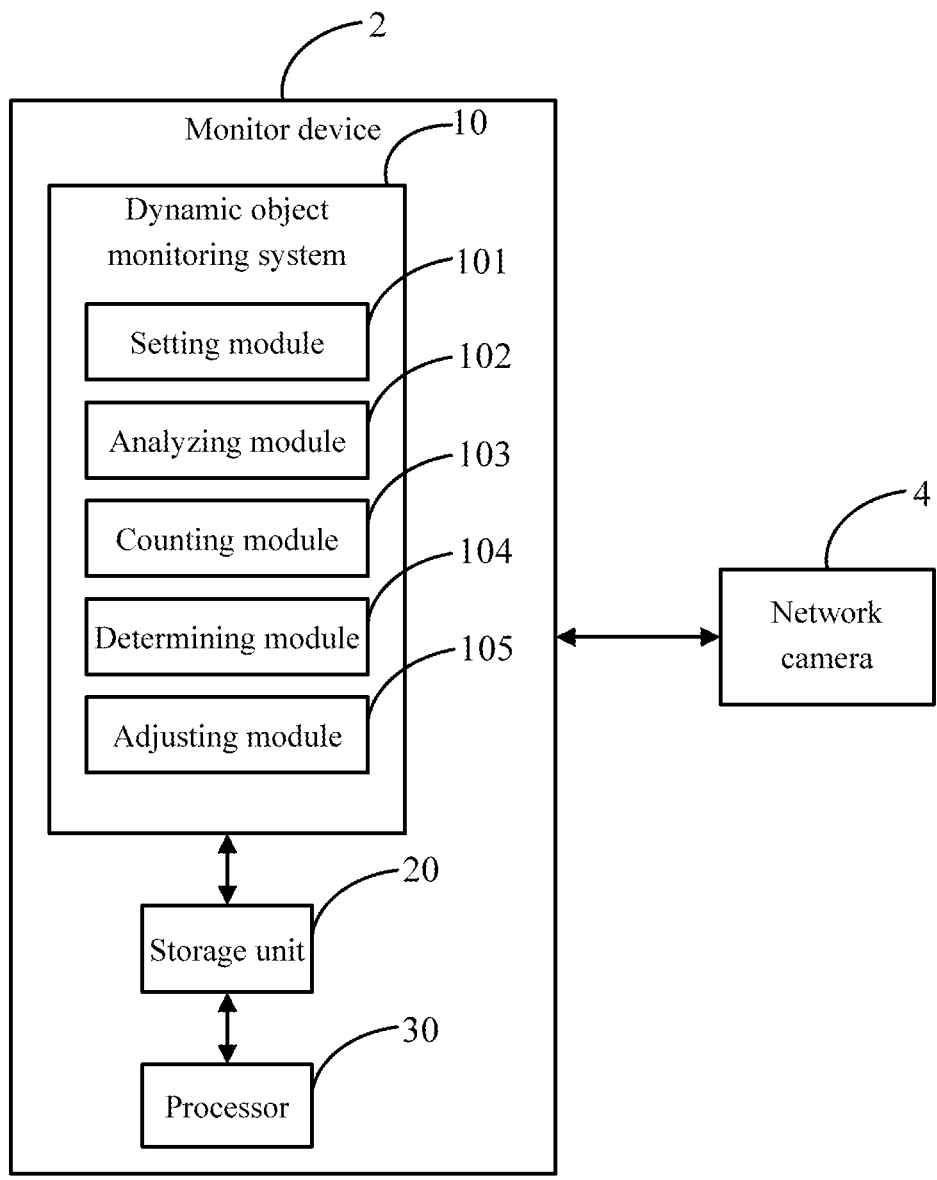
FIG. 1 illustrates a block diagram of an embodiment of a function of a monitor device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of function modules of the monitor device 2. In the illustrated embodiment, the monitor device 2 includes a dynamic object monitoring system 10, a storage unit 20 and a processor 30. The monitor device 2 connects a network camera 4 through a network to control and receive monitoring data from the network camera 4. The dynamic object monitoring system 10 detects dynamic objects within a monitored region for the network camera 4 and initiates a recording via the network camera 4.

In one embodiment, the dynamic object monitoring system 10 includes a setting module 101, an analyzing module 102, a counting module 103, a determining module 104 and an adjusting module 105. One or more of the function modules include computerized codes in the form of one or more programs that are stored in the storage unit 20 and executed by the processor 30 to provide functions of the dynamic object monitoring system 10. The storage unit 20 can be a dedicated memory, such as an EPROM or a flash memory. Descriptions of the functions of the modules 101-105 are given with reference to FIG. 3.

Figure 3:
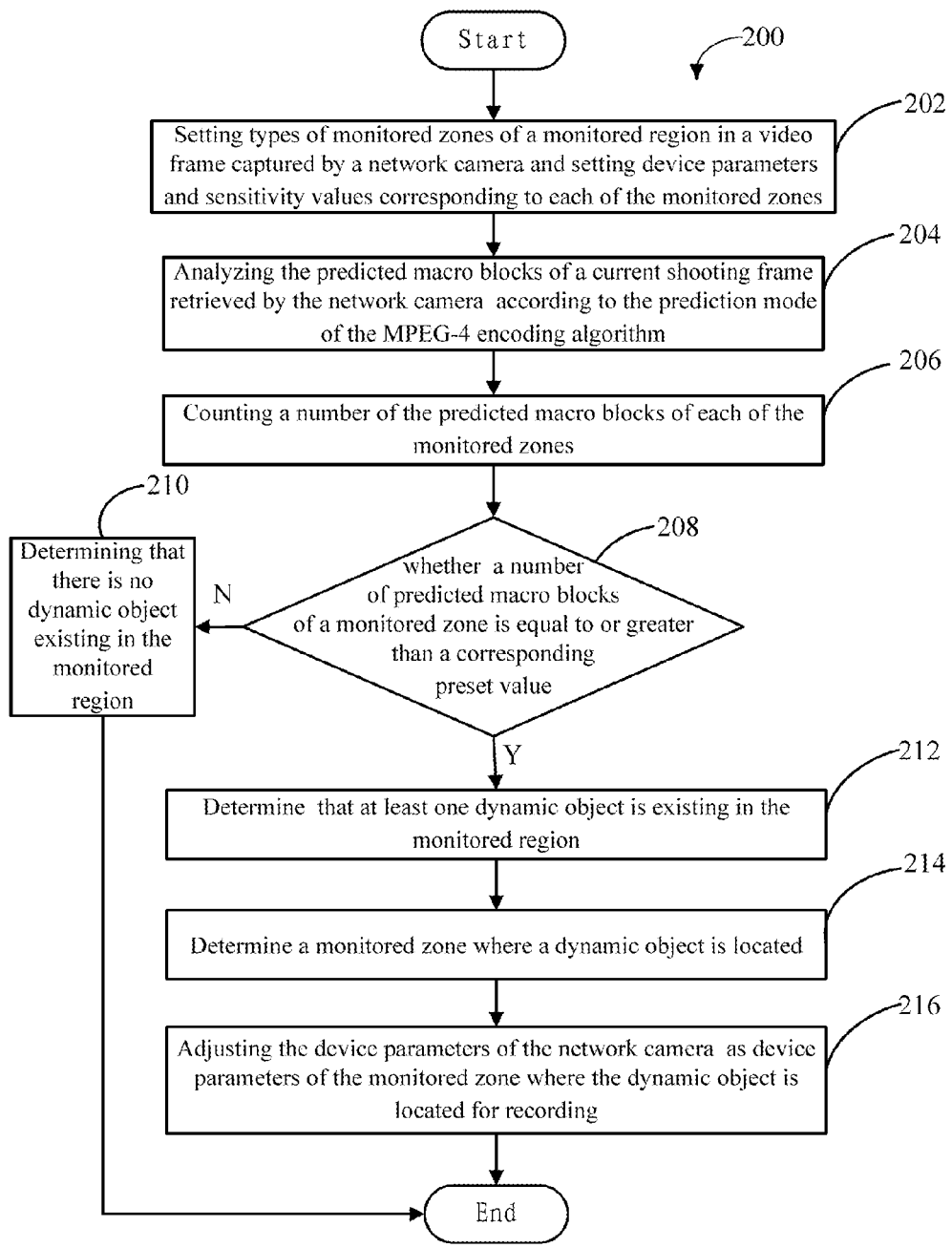
FIG. 3 illustrates a flowchart of an embodiment of a dynamic object monitoring method.

FIG. 3 presents a flowchart in accordance with an embodiment of a monitoring method 200. The monitoring method 200 is provided by way of example, as there are a variety of ways to carry out the method. The method 200 described below can be carried out using the configurations illustrated in FIG. 1, for example, and various elements of these figures are referenced in explaining the processing method 200. Each block shown in FIG. 3 represents one or more processes, methods, or subroutines, carried out in the exemplary processing method 200. Additionally, the illustrated order of blocks is by example only and the order of the blocks can change. The monitoring method 200 can begin at block 202.

Figure 2:
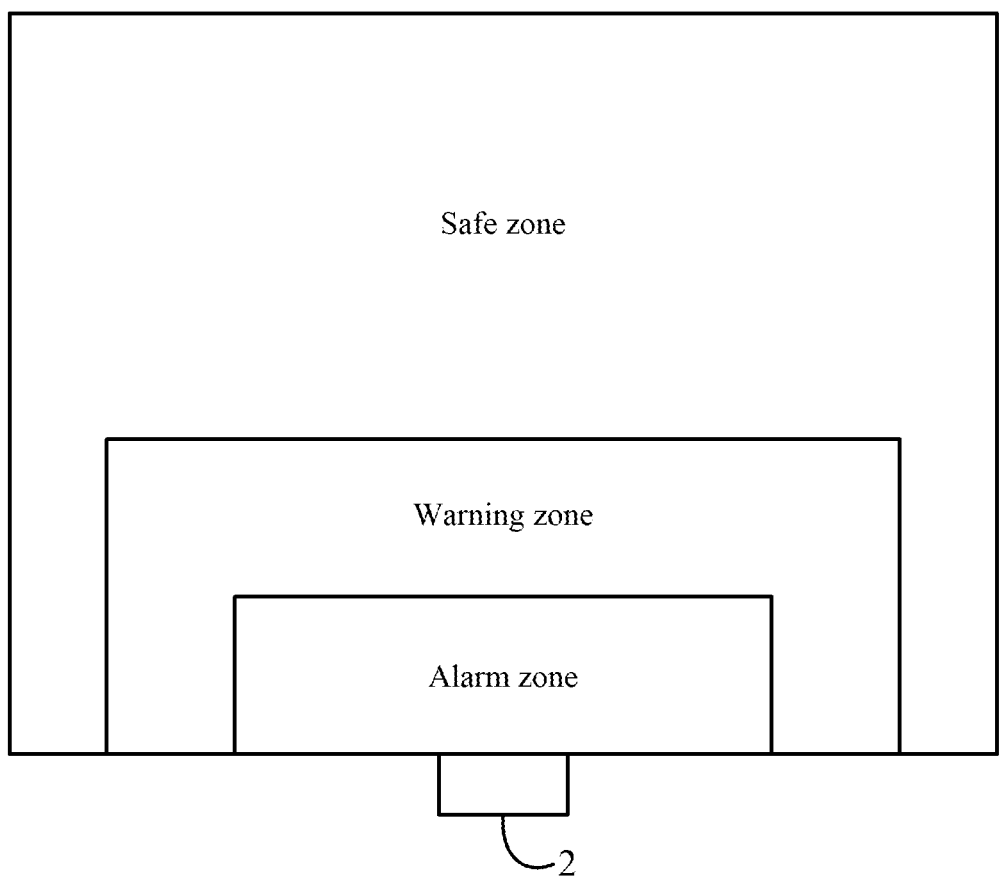
FIG. 2 illustrates a diagrammatic sketch of an embodiment of monitored zones.

At block 202, the setting module 101 sets types of monitored zones of the monitored region in a video frame captured by a network camera and sets device parameters and sensitivity values corresponding to each of the monitored zones. In one embodiment, the monitored zones include a safe zone, a warning zone and an alarm zone as shown in FIG. 2. The device parameters include, for example, focal lengths and encoding frames of the network camera 4. The sensitivity values refer to the quantity of preset values of predicted macro blocks in a monitored zone according to a prediction mode of the fourth generation motion picture expert group (MPEG-4) standard, which determines whether a dynamic object exists in the monitored region. When the number of predicted macro blocks of a monitored zone is equal to or greater than the preset value, meaning that the sensitivity value of the monitored zone is satisfied, it is determined that at least one dynamic object exists in the monitored zone.

At block 204, the analyzing module 102 analyzes the predicted macro blocks of a current shooting frame retrieved by the network camera 4 according to the prediction mode of the MPEG-4 encoding algorithm. In one embodiment, the prediction mode provides 4 by 4 predicted macro blocks and 16 by 16 predicted macro blocks.

At block 206, the counting module 103 counts a number of the predicted macro blocks of each of the monitored zones. For example, counting a number of 4 by 4 or 16 by 16 predicted macro blocks respectively detected in each of the safe zone, the warning zone and the alarm zone are counted.

At block 208, the determining module 104 determines whether a number of predicted macro blocks of a monitored zone is equal to or greater than a corresponding preset value.

At block 210, when the number of predicted macro blocks of any of the monitored zones does less than the corresponding preset value, the determining module 104 determines that there is no dynamic object existing in the monitored region.

At block 212, when the number of predicted macro blocks of at least one monitored zone is equal to or greater than the corresponding preset value, the determining module 104 determines that at least one dynamic object is existing in the monitored region.

At block 214, the determining module 104 determines a monitored zone where a dynamic object is located. In one embodiment, when over 50% of the measured square of a dynamic object is detected to be displayed in a monitored zone, the dynamic object is determined to be located in the monitored zone.

At block 216, the adjusting module 105 adjust the device parameters of the network camera 4 as device parameters of the monitored zone where the dynamic object is located for recording.

In one embodiment, when the dynamic object is located in the safe zone, the device parameters for the network camera 4 are configured as the minimum encoding frames and the maximum focal length for recording. When the dynamic object is located in the warning zone, the device parameters for the network camera 4 are configured as higher encoding frames and automatic focusing on the dynamic object is activated for recording. When the dynamic object is located in the alarm zone, the device parameters for the network camera 4 are configured as the maximum encoding frames, automatic focusing for the dynamic object is activated, and the maximum hardware performance is enabled for recording.

The embodiments shown and described above are only examples. Many details are often found in the art such as the other features of a monitor device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A monitor device, which is controlling a network camera, the monitor device comprising:
   at least one processor;
   a storage system; and
   one or more programs that are stored in the storage system and executed by the at least one processor, the one or more programs comprising instructions for:
   setting types of monitored zones of a monitored region in a video frame captured by a network camera;
   setting device parameters and sensitivity values corresponding to each of the monitored zones, wherein the sensitivity values refer to the quantity of preset values of predicted macro blocks in a monitored zone according to a prediction mode of the fourth generation motion picture expert group (MPEG-4) standard; wherein the device parameters include focal length and encoding frames of the network camera, when the dynamic object is located in a safe zone, the device parameters for the network camera are configured as the minimum encoding frames and the maximum focal length for recording, when the dynamic object is located in a warning zone, the device parameters for the network camera are configured as higher encoding frames and automatic focusing on the dynamic object is activated for recording, and when the dynamic object is located in a alarm zone, the device parameters for the network camera are configured as the maximum encoding frames, automatic focusing for the dynamic object is activated, and the maximum hardware performance is enabled for recording;
   analyzing the predicted macro blocks of a current shooting frame retrieved by the network camera according to the prediction mode of the MPEG-4 encoding algorithm;
   counting a number of the predicted macro blocks of each of the monitored zones;
   determining whether a number of predicted macro blocks of a monitored zone is equal to or greater than a corresponding preset value;
   when the number of predicted macro blocks of at least one monitored zone is equal to or greater than the corresponding preset value, determine a monitored zone where a dynamic object is located; and
   adjusting the device parameters of the network camera as device parameters of the monitored zone where the dynamic object is located for recording.

2. The monitor device as claimed in claim 1, further comprising instructions for:
   determining the dynamic object is not existing in the monitored zone when the number of predicted macro blocks of at each of the monitored zones is less than the corresponding preset value.

3. The monitor device as claimed in claim 1, wherein the prediction mode include 4 by 4 predicted macro blocks and 16 by 16 predicted macro blocks.

4. A dynamic object monitoring method, executable by a processor of a server, the method comprising:
   setting types of monitored zones of a monitored region in a video frame captured by a network camera;
   setting device parameters and sensitivity values corresponding to each of the monitored zones, wherein the sensitivity values refer to the quantity of preset values of predicted macro blocks in a monitored zone according to a prediction mode of the fourth generation motion picture expert group (MPEG-4) standard; wherein the device parameters include focal length and encoding frames of the network camera, when the dynamic object is located in a safe zone, the device parameters for the network camera are configured as the minimum encoding frames and the maximum focal length for recording, when the dynamic object is located in a warning zone, the device parameters for the network camera are configured as higher encoding frames and automatic focusing on the dynamic object is activated for recording, and when the dynamic object is located in a alarm zone, the device parameters for the network camera are configured as the maximum encoding frames, automatic focusing for the dynamic object is activated, and the maximum hardware performance is enabled for recording;

analyzing the predicted macro blocks of a current shooting frame retrieved by the network camera according to the prediction mode of the MPEG-4 encoding algorithm;

counting a number of the predicted macro blocks of each of the monitored zones;

determining whether a number of predicted macro blocks of a monitored zone is equal to or greater than a corresponding preset value;

when the number of predicted macro blocks of at least one monitored zone is equal to or greater than the corresponding preset value, determine a monitored zone where a dynamic object is located;

adjusting the device parameters of the network camera as device parameters of the monitored zone where the dynamic object is located for recording.

5. The method as claimed in claim 4, further comprising:
determining the dynamic object is not existing in the monitored zone when the number of predicted macro blocks of at each of the monitored zones is less than the corresponding preset value.

6. The method as claimed in claim 4, wherein the prediction mode include 4 by 4 predicted macro blocks and 16 by 16 predicted macro blocks.

\* \* \* \* \*